Patented Nov. 4, 1924.

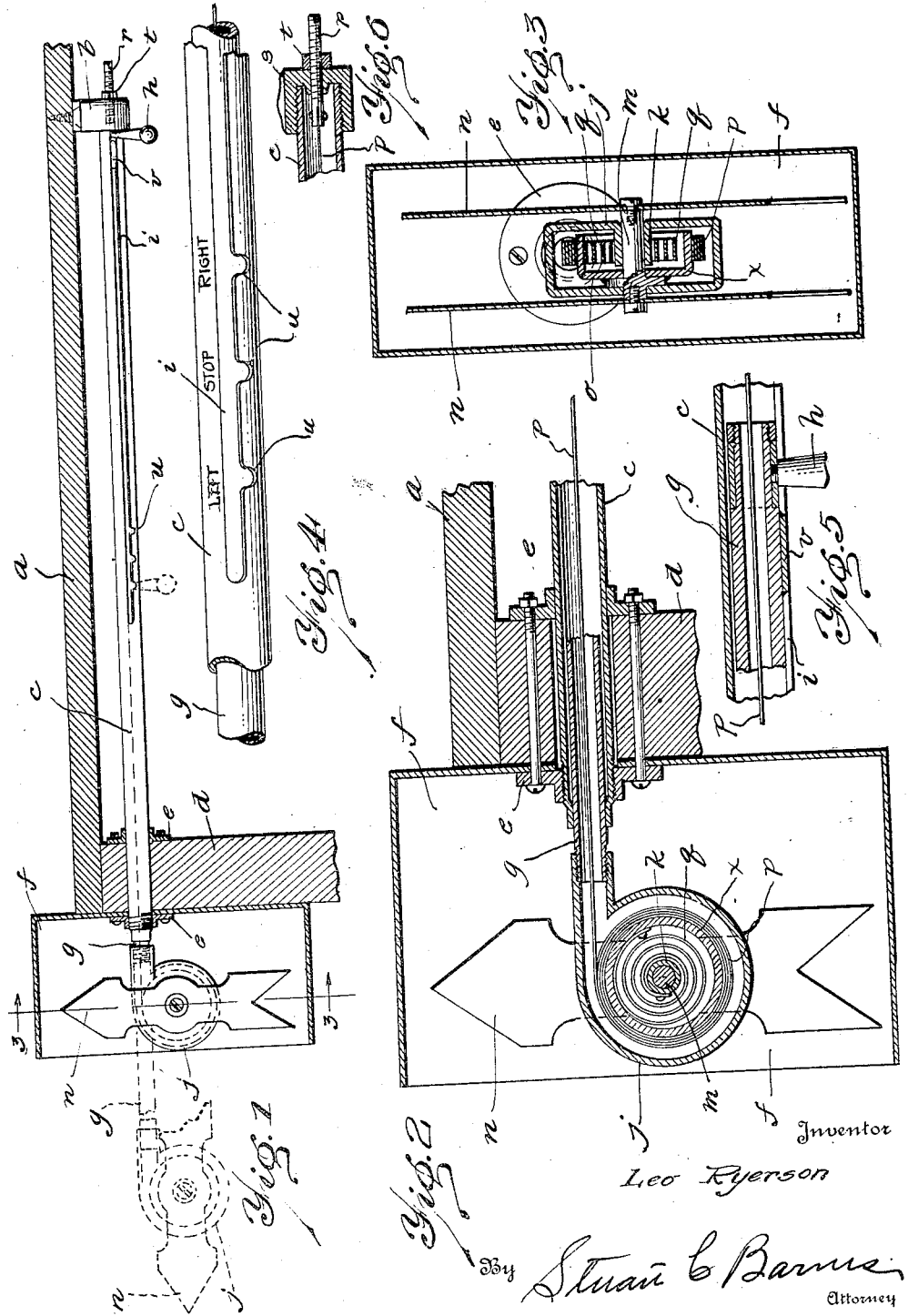

1,513,787

UNITED STATES PATENT OFFICE.

LEO RYERSON, OF PORTLAND, MICHIGAN.

SIGNALING DEVICE.

Application filed July 12, 1923. Serial No. 650,989.

*To all whom it may concern:*

Be it known that I, LEO RYERSON, a citizen of the United States, residing at Portland, in the county of Ionia and State of Michigan, have invented certain new and useful Improvements in Signaling Devices, of which the following is a specification.

This invention relates to a signaling device which is more particularly adapted for truck use.

The large automobile trucks are provided with a wide body in the rear of the driver's seat, and it is impossible for the driver of the vehicle following the truck to see the truck driver's hand when he motions to indicate a turn or a stop. Much confusion can result if the driver of the truck does not take care in indicating by some manual means, when he is going to turn or to stop, and quite often serious accidents will result from a failure to indicate the truck movements to the persons following.

Some devices have been installed on trucks which throw out an arm which can be seen by persons operating the car behind the truck, but as far as I know, no one has designed a signaling device for truck use which is capable of being extended far enough to the side of the truck so that it can be perceived by the persons following, and which is provided with means for signaling a right or left hand turn or a stop.

One object of my invention is to provide a signaling device that is capable of being extended a sufficient distance to the side of the vehicle, said signaling device provided with an indicator at the end thereof which will indicate a right hand turn, a left hand turn, or a stop.

A further object is to provide a controlling means whereby the operator of the truck can readily set the signaling device to indicate to those driving behind, what direction he is going to take. Another object is to so connect the mechanisms for moving the indicating mechanism longitudinally and for rotating the indicator that they will act together, the longitudinal travel of the indicating mechanism controlling the position of the indicator.

This form of signaling device has many advantages in that the operator of the vehicle may keep both hands on the wheel while turning a corner, since he is able to set the signaling device any time previous to the turning of the corner. Another advantage is that the arrangement of my device is such that it can be seen from the front as well as the rear and clearly signals the operator's intentions to everyone whether following or traveling in the opposite direction.

This construction can be utilized on passenger vehicles although probably it will be mostly used on trucks having a wide body to the rear of the driver's cab. The device is so arranged that it can be made in different lengths depending on the width of the truck body. The apparatus is readily installed on the vehicle by drilling a hole in the side of the cab and fitting the tube therethrough. When it is impossible to mount the device on the roof of the cab, the same could be fastened to the dash or any other part of the vehicle within reach of the operator.

It will be obvious from the following description that the device is cheaply and easily made, can be easily and accurately operated to positively signal the driver's intentions at all times.

In the drawings:

Fig. 1 is an elevational view partly in section of my signalling device.

Fig. 2 is an enlarged sectional view of the indicating end of the device.

Fig. 3 is a section on the line 3—3 of Fig. 1.

Fig. 4 is a detail of the indicator locating notches.

Fig. 5 is a detail in section of the handle connections for manually and longitudinally moving the indicating signals.

Fig. 6 is a detail in section of the inner end of the device showing the adjusting means for the tape.

The top wall $a$ of the truck cab has secured to the underside thereof, a bracket $b$ for supporting a tubular member $c$ which extends horizontally beneath the roof of the cab and passes through the side wall $d$. Suitable bearing members $e$ are secured to the side wall of the cab for supporting the tubular member $c$ and the housing $f$ in which the indicator is located when the same is in a non-indicating position.

Slidable within the tubular member $c$ is a second tubular member $g$ which has a handle $h$ secured at one end adapted to be slidably guided in the elongated slot $i$ in the outer tubular member $c$. The indicating device is secured to the other end of the tubular member $g$ and comprises a casing $j$ (see Fig. 3) which is provided with a bearing flange $k$ for rotatably supporting a stud shaft $m$. A pair of indicators $n$ preferably shaped to form an arrow as shown in the drawings, are secured to the stud shaft; a drum $x$ is welded or otherwise secured to the shaft and a steel tape or ribbon $p$ is wound around the drum. A coiled take-up spring $q$ having one end secured to the drum and the other end to the casing, is contained within the drum to wind the same up, when the indicating device is returned to the inoperative position. The other end of the tape is secured to an adjusting screw $r$ which has a threaded adjustment in the cap $s$ secured to the inner end of the tube $c$. A lock nut $t$ is threaded on the adjusting screw $r$ to lock the same when the proper adjustment is made.

The slot $i$ in the tubular member $c$ is provided with a series of notches $u$ (see Fig. 4) and the tubular member $g$ is provided with an elongated lug $v$ which is adapted to slide in the slot $i$. When the operator pushes on the handle $h$ to move the tubular member $g$, to its extended position, he will stop the handle at any one of these notches, and the handle will drop in the corresponding notch. In this way the driver of the vehicle by selecting the proper notch can move the handle for indicating a left-hand turn, right-hand turn, or stop, as will now be described.

As the tubular member $g$ moves outwardly carrying with it the indicating mechanism which is secured thereto, it will cause the tape $p$ to unwind on the drum $o$ thereby causing the drum to rotate. Since the stud shaft $m$ is secured to the drum the indicating arrows will be rotated as the indicating mechanism travels longitudinally outwardly. The notches in the slot $i$ are so located that when the handle reaches the first notch designated "Right," the arrow will be pushed to indicate a right-hand turn by pointing the arrow to the right. When the handle is moved to the notch labeled "Stop," the arrow will point down, thus indicating to the driver of the following vehicle that the truck is going to stop. The third position of the handle labeled "Left" is so located that the arrow will point to the left when the handle is stopped and engaged in this notch.

It is thus seen that the distance traveled by the longitudinal sliding tubular member which carries with it the indicating mechanism controls the positioning of the indicator, so that the driver of the truck can indicate to those following what he is going to do, by merely moving the operating handle secured to the tubular member $g$, the correct distance. As an aid for the truck driver, I have provided these notches and labeled them correctly so that he can correctly position the indicator to signal those following.

What I claim is:

1. In a signaling device, the combination of a support, an indicating mechanism slidably supported in the support and provided with an indicator, and means for moving the indicating mechanism and indicator and continuously rotating said indicator as the indicating mechanism and indicator travel longitudinally.

2. In a signaling device, the combination of a support, an indicating mechanism slidably supported thereby and including a rotatable indicator, and means for longitudinally moving the indicating mechanism with respect to its support for actuating the indicating mechanism to rotate the indicator during such movement of the indicating mechanism.

3. In a signaling device, the combination of a support, an indicating mechanism slidably supported by the support and including a drum, and a tape having one end secured to the drum and the other end to the support, a take-up spring secured to the drum, an indicator secured to the drum, and means for longitudinally moving the indicating mechanism and drum with respect to its support thereby causing the tape to unwind from the drum to rotate the drum and indicator.

4. In a signaling device, the combination of a support, a tubular member secured thereto, an indicating device including a tubular extension adapted to be slidably fitted in the first mentioned tubular member, said indicating mechanism also including a movable indicator, and means for longitudinally moving the indicating mechanism including the tubular extension and indicator with respect to the first mentioned tubular member for actuating the indicating mechanism to move the indicator during such movement of the indicating mechanism.

5. In a signaling device, the combination of a support, an indicating mechanism slidably supported thereby and including a rotating indicator, means for longitudinally moving the indicating mechanism and indicator to rotate said indictator, and means for limiting the travel of said indicating mechanism at predetermined points to locate the indicator in predetermined positions.

6. In a signaling device, the combination of a support, an indicating mechanism slidably supported thereby and including a movable indicator, means for longitudinally moving the indicating mechanism and indicator thereby moving the said indicator, and means for limiting the travel of said indicating mechanism to locate the indicator in a predetermined position.

7. In a signaling device, the combination of a support, an indicating mechanism slidably supported by the support and including a drum and a tape having one end secured to the drum and the other end to the support, means for longitudinally moving said indicating mechanism with respect to the support thereby causing the tape to unwind off the drum to rotate the drum and indicator, and means carried by the indicating mechanism to wind the tape on the drum when the same is moved back to a non-indicating position.

8. In a signaling device, the combination of a support, a pair of telescoping tubular members, one being held stationary and the other movable, the stationary tubular member provided with a slot, the movable tubular member provided with a handle adapted to project through said slot and to be guided therein, the said movable tubular member having secured on the end thereof an indicating device, and means for continuously rotating said indicating device as the movable tubular member and indicating device are moved longitudinally with respect to the stationary tubular member.

9. In a signaling device, the combination of a support, a stationary tubular member provided with an elongated slot having a series of notches off-set therefrom, a second tubular member telescoping within the first mentioned tubular member and provided with a handle adapted to engage through said slot and to be guided therein, the said second mentioned tubular member having an indicating device secured on the end thereof, and means for moving the indicator as the second mentioned tubular member and indicator are moved longitudinally, the handle carried thereby engaging in one of the notches off-set from the slot to limit the longitudinal travel of said second tubular member and locate the indicator in a pre-determined position.

10. In a signaling device, the combination of a support, a stationary tubular member secured thereto and provided with a longitudinal slot, a second tubular member telescoping within the first mentioned tubular member and provided with a handle projecting through said slot and guided therein, the said second tubular member having secured on the outer end thereof an indicating mechanism including an indicator and a drum provided with a take-up spring, and a tape wound around said drum and having one end secured to the drum and the other end to the stationary tubular member whereby the drum and indicator are rotated as the second mentioned tubular member is moved longitudinally.

11. In a signaling device, the combination of a support, an indicating mechanism slidably supported thereby and provided with a movable indicator and a drum, a take-up spring secured within the drum and a tape wound around the drum having one end secured thereto and the other end extending through the second mentioned tubular member, and an adjusting screw carried by the stationary tubular member to which is secured the free end of the tape for the purpose of adjusting the tension of said tape.

In testimony whereof I affix my signature.

LEO RYERSON.